United States Patent [19]

Brunetti

[11] Patent Number: 4,876,823
[45] Date of Patent: Oct. 31, 1989

[54] INSECT TRAP

[76] Inventor: Anthony Brunetti, 423 Charlotte, Royal Oak, Mich. 48073

[21] Appl. No.: 207,901

[22] Filed: Jun. 14, 1988

Related U.S. Application Data

[63] Continuation of Ser. No. 31,351, Mar. 30, 1987.

[51] Int. Cl.$^4$ .............................................. A01M 1/14
[52] U.S. Cl. ....................................... 43/114; 43/124
[58] Field of Search .................. 43/114, 115, 116, 117, 43/107, 108, 109, 131, 132.1, 136

[56] References Cited

U.S. PATENT DOCUMENTS

| 825,275 | 7/1906 | Laube | 43/115 |
|---|---|---|---|
| 1,335,845 | 4/1920 | Long | 43/108 |
| 2,087,164 | 7/1937 | Purifoy | 43/107 |
| 2,143,043 | 1/1939 | Wexler | 43/108 |
| 2,911,756 | 11/1959 | Geary | 43/114 |
| 4,217,722 | 8/1980 | McMullen | 43/114 |
| 4,281,471 | 8/1981 | Jenkins et al. | 43/131 |
| 4,709,504 | 12/1987 | Andric | 43/114 |

Primary Examiner—M. Jordan
Attorney, Agent, or Firm—Krass & Young

[57] ABSTRACT

An insect trap consists of an elongated section of sheet plastic bent to have a uniform cross section characterized by a flat base and a curved section extending from one of the edges of the base upwardly and toward the free edge and then downwardly toward the base, to form a re-entrant trap section. A pressure sensitive coating on the underside of the base allows the base to be secured to a supporting surface. A pressure sensitive adhesive coating and a pesticide are disposed within the trap section to capture insects that enter the trap from the supporting surface. The trap is made of low cost plastic material and may be disposed with the trapped insects after use.

9 Claims, 1 Drawing Sheet

U.S. Patent Oct. 31, 1989 4,876,823
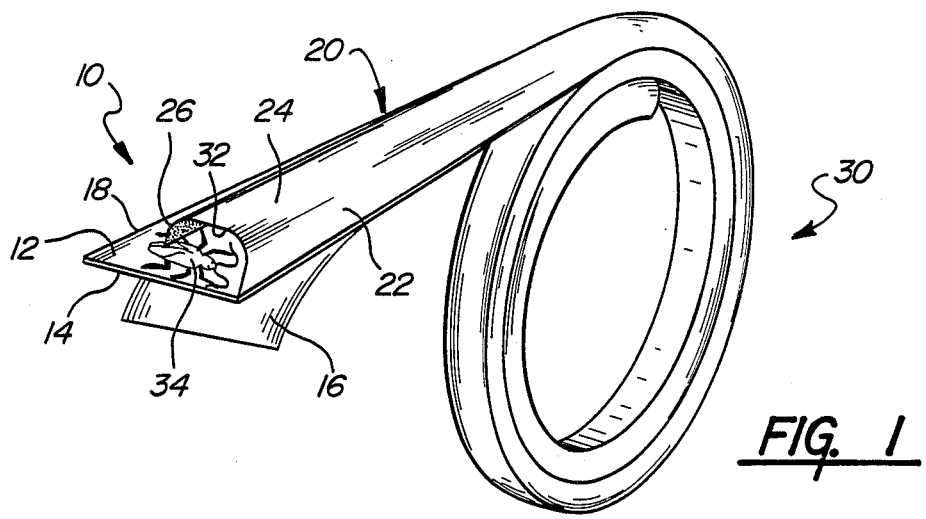
FIG. 1
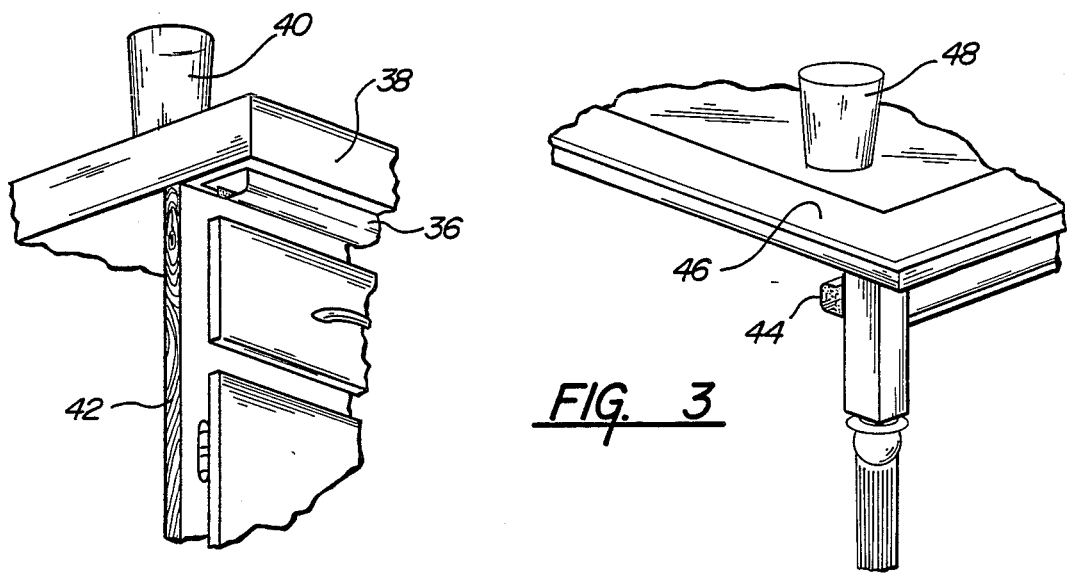
FIG. 2
FIG. 3
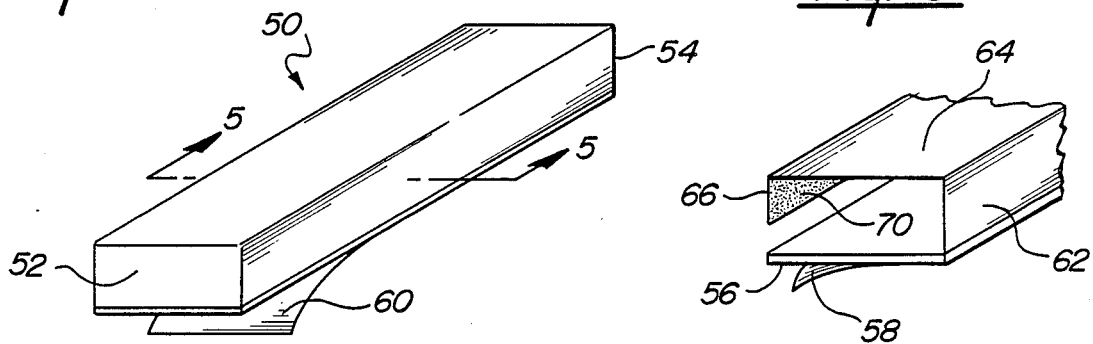
FIG. 4
FIG. 5

INSECT TRAP

This is a continuation of co-pending application Ser. No. 031,351 filed on 3/30/87.

FIELD OF THE INVENTION

This invention relates to insect traps formed of elongated sections of sheet material spirally bent and coated with adhesives to provide a supporting base section and an insect capturing trap section.

BACKGROUND OF THE INVENTION

Pressure sensitive adhesives have long been used to entrap insects on sheet surfaces. Fly paper, consisting of an elongated paper section coating on both sides with a pressure sensitive adhesive and adapted to be hung from a ceiling, was commonly used before the days of window screens. The adhesive coatings on the fly paper were sometimes coupled with insecticides to kill the flies or ordoriferous materials to attract the flies. These fly papers were very effective but were generally regarded as unsightly because they openingly displayed the dead flies.

Similar pressure sensitive adhesive coated traps were provided for crawling insects, such as roaches and the like, but their dramatic display of the trapped insects greatly limited their popularity.

The present invention is accordingly directed toward a trap which hides crawling insects caught in the trap from view and allows disposal of the insects with the trap without exhibiting them.

SUMMARY OF THE INVENTION

The insect trap of the present invention comprises an elongated strip of sheet material, preferably light gauge plastic such as polyethylene or alternatively cardboard, pressed board or the like, bent and rebent to have a substantially uniform cross section along its length. The section will have sufficient rigidity to prevent deformation under gravity forces, but preferably has sufficient flexibility along its longitudinal axis to allow it to be supplied in rolls, from which a section of desired length may be cut.

The cross section of the trap is characterized by a flat base having a pressure sensitive adhesive coating on its outer side so that it may be secured to an appropriate supporting surface where insects tend to migrate. The pressure sensitive coating on the base is preferably covered before use by a paper or plastic strip, which may be removed to press the base section against the supporting surface.

The trap includes a wall, preferably integral with one edge of the base, and extending first away from the base, then parallel to the base so as to overlie at least a portion of the base, then down toward the base terminating in a free edge. This shape includes a trap section defined by the interior side of the free edge and the opposing surfaces of its adjacent walls. One or more of these interior opposing surfaces is coated with a tacky layer adapted to capture insects moving over the surfaces. The coating may include an insecticide and/or an insect attracting material.

Domestic vermin, such as roaches, typically live in inaccessible recesses and travel to sources of food and water at night. The traps are preferably placed along surfaces that the insects must traverse to reach their destination in such a way that the insects walk across the base and up into the trap section. In the trap section the captured insects are hidden from view and after a number have been collected in the trap the entire trap, with the enclosed insects may be discarded and replaced with a new trap section.

The traps may be placed under food containing cabinets, on the undersurfaces of tables and the like so as to be inconspicuous. Traps may be provided in preformed lengths with closed end sections which completely hide the insects caught within the traps.

BRIEF DESCRIPTION OF THE DRAWINGS

Other objectives, advantages and applications of the present invention will be made apparent by the following detailed description of preferred embodiments of the invention. The description makes reference to the accompanying drawings in which:

FIG. 1 is a perspective view of a preferred embodiment of the trap, provided in a roll form, and illustrating an insect captured in the trap;

FIG. 2 is a perspective, detailed sectional view of a cabinet showing a length of the insect trap of FIG. 1 installed;

FIG. 3 is a detailed sectional view of a corner of a table, showing a section of the trap of FIG. 1 installed;

FIG. 4 is a perspective view of an alternative embodiment of the trap having closed ends; and FIG. 5 is a cross-sectional view of the trap of FIG. 4, taken along line 5—5 of FIG. 4.

DETAILED DESCRIPTION OF EMBODIMENTS OF THE INVENTION

A preferred embodiment of the insect trap of the present invention, generally indicated at 10 in FIG. 1, consists of an elongated section of sheet material, preferably plastic, such as polyethylene, having a uniform transverse cross section which is visible at either end of the elongated section. The cross- section includes a generally planar base 12 which typically has a transverse dimension of between 1 and 3 inches. The side of the base 12 which is visible from the end of the section illustrated in FIG. 1 will be arbitrarily termed the upperside. The underside of the base 12 is coated with a pressure sensitive adhesive 14. A sheet of cover paper, 16, one edge of which is illustrated as separated from the underside of the base, protects the coating prior to use. When a length of the trap 10 is to be put into use, the cover sheet 16 is manually stripped away and the underside of the base 12 is pressed against a suitable supporting surface to secure the trap in place.

The base 12 has one free side edge 18. A trap wall 20 is preferably formed integrally with the opposite edge of the base 12. The wall 20 is preferably curvingly bent in a counterclockwise direction as illustrated in FIG. 1. In other embodiments of the invention, which will subsequently be described in detail, the trap wall is not continuously curved but is rather characterized by sharp bends.

The section of the wall 20 immediately adjacent the base 12 extends generally normally to the base, as at 22 and then curves over the base so as to extend generally parallel to the base, in a section 24. At its far extension, generally overlying the free edge 18 of the base 12, the trap wall curves downwardly toward the base in an end section 26.

This configuration may be formed in a number of ways, such as by continuous extrusion of the trap 12 or thermal forming. In alternative embodiments the trap may be formed from paper or hardboard stock. It could also be fabricated in a rigid material.

The material of the preferred embodiment has sufficient rigidity so as to maintain the shape illustrated in FIG. 1 against gravity forces or the like. The material preferably has sufficient longitudinal flexibility as to allow it to be arrayed in a roll, generally indicated at 30, for distribution and storage purposes. Elongated sections of the material of roll form could be provided and a desirable length of trap could be cut from the end of the roll with scissors or the like.

The interior opposed surfaces of the trap wall sections 22, 24 and 26 form a semi-enclosed volume, opening toward the base 12. At least some of and preferably all of the wall surfaces bounding this volume are coated with an adhesive 32 of the type previously used on fly paper or the like for entrapping insects. The coating may include a pesticide for the entrapped insects as well as odoriferous compounds intended to attract roaches and the like. An insect 34 is illustrated as being entrapped within the semienclosed trap volume in FIG. 1.

FIG. 2 illustrates a length of the trap, 36, secured within a cabinet in a typical mode of application. The cabinet includes a shelf 38 illustrated as supporting a drinking glasses 40. The shelf 38 is supported by an upright wall 42. Insects will typically proceed up the wall 42 to gain access to the food utensils 40 supported on the shelf 38. The trap section 36, which preferably has a longitudinal dimension equal in length to the shelf 38, is secured to the underside of the shelf by the pressure sensitive coating 14 on the underside of the base 12 so that the trap section extends below the shelf. From the outer side of the shelf, to the right in FIG. 2, the trap area is invisible. Insects moving toward the top of the shelf 38 walk over the upperside of the wall surface 12 of the trap and enter the volume bounded by the wall surfaces 22, 24 and 26 to become entrapped in the adhesive coating formed therein. The entrapped insects are not visible from the forward side of the shelf. When a number of insects have accumulated in the trap the entire section may be removed and discarded, with the entrapped insects, and replaced by a fresh trap.

FIG. 3 illustrates a trap section 44 secured to the underside of a table 46 which supports a drinking glass 48. Again the trap is positioned so as to be hidden in normal use without in any way impairing its function.

An alternative embodiment of the trap is generally illustrated at 50 in FIGS. 4 and 5. It consists of a preformed length of trap having right angle bends in the sidewall and closed ends 52 and 54. This embodiment of the trap employs a planar base section 56 having its underside 58 coated with a pressure sensitive adhesive. A cover paper 60 protects the adhesive coating prior to use.

A side wall 62 is formed normally to one edge wall of the base 56. A top wall 64 is formed integrally with the upper edge of the wall 62 and extends parallel to and overlying the base 56. A second side wall 66 projects from the far edge of the top 64 in the direction of the base 56.

The opposed surfaces of the walls 62, 64 and 66 are coated with a suitable material 70 for attracting and entrapping and poisoning insects walking over its surfaces. Closed end walls 52 and 54 completely hide the trap area from view.

The embodiment illustrated in FIGS. 4 and 5 may be formed of more rigid material than the embodiment of FIG. 1 since it need not be formed in a roll section.

Having thus described my invention I claim:

1. A trap for insects consisting of an elongated member formed of sheet material having a uniform cross section along its length, said cross section being characterized by:
   a flat base member having an underside and an upperside, the underside being coated with a pressure sensitive adhesive operative to allow the section to be secured to a supporting surface with the underside of the base member in contact with the surface;
   an upper portion connected to the base member at one edge thereof, said upper portion comprising three sections running longitudinally along the base;
   a first section projecting substantially laterally upwardly away from the base section;
   a second section extending substantially parallel to the base, so as to overlie the base; and
   a third section extending substantially downwardly toward the base with the free edge of the third section terminating at a spaced distance from the base providing an area between the base and the free edge of the base which is clear of supporting structure; and
   a pressure sensitive adhesive coating on the interior opposed sides of the trap section, whereby an insect walking over the upper side of the base section would become entangled in the last said adhesive.

2. The insect trap of claim 1 wherein the walls are formed of a sheet material having sufficient rigidity to retain its shape against gravity forces when the base is secured to a supporting surface by its pressure sensitive adhesive coating and having sufficient longitudinal flexibility to allow the elongated section to be spirally wrapped into a roll.

3. The trap of claim 1 further including a paper layer overlying the pressure sensitive coating on the underside of the base, the paper layer being adapted to be manually removed when the trap is to be secured to a supporting surface.

4. The insect trap of claim 1 including sheet covering the opposed ends of the length of trap, said sheet end sections extending normally to the sheet material of the trap.

5. The trap of claim 1 wherein said trap member constitutes a continuously curved section.

6. The insect trap of claim 1 wherein the trap member is formed with at least two right angle bends to create said first section extending normally to the base from the edge of the base opposite the free edge, said second section extending from the first section substantially parallel to the base, and said third section extending from the edge of the second section downwardly toward the base, and terminating short of the base, said pressure sensitive trap coating being formed on the opposed interior surfaces of said first, second and third sections.

7. The trap of claim 1 wherein said sheet material constitutes plastic.

8. The trap of claim 8 wherein said sheet material constitutes polyethylene.

9. The trap of claim 2 further including insecticide disposed within said trap section.

* * * * *